United States Patent
Lejon et al.

(10) Patent No.: US 11,608,772 B2
(45) Date of Patent: *Mar. 21, 2023

(54) PRE-CHAMBER ARRANGEMENT FOR A GAS ENGINE AND A GAS ENGINE

(71) Applicant: Scania CV AB, Södertälje (SE)

(72) Inventors: Svante Lejon, Huddinge (SE); Pål Axelsson, Tyresö (SE)

(73) Assignee: Scania CV AB, Södertälje (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,205

(22) Filed: Feb. 28, 2022

(65) Prior Publication Data
US 2022/0186658 A1 Jun. 16, 2022

Related U.S. Application Data

(63) Continuation of application No. 17/282,010, filed as application No. PCT/SE2019/050972 on Oct. 7, 2019, now Pat. No. 11,261,778.

(30) Foreign Application Priority Data

Oct. 11, 2018 (SE) .................................... 1851243-4

(51) Int. Cl.
  *F02B 19/18* (2006.01)
  *F02B 19/08* (2006.01)
  (Continued)

(52) U.S. Cl.
  CPC .............. *F02B 19/18* (2013.01); *F02B 19/08* (2013.01); *F02B 19/1023* (2013.01); *F02B 43/00* (2013.01)

(58) Field of Classification Search
  CPC ...... F02B 19/18; F02B 19/08; F02B 19/1023; F02B 43/00
  See application file for complete search history.

(56) References Cited

U.S. PATENT DOCUMENTS 2,969,050 A   1/1961   Greier et al.
4,930,473 A   6/1990   Dietrich
(Continued)

FOREIGN PATENT DOCUMENTS

DE   102017130741 A1   2/2018
EP       2520780 A1   11/2012
(Continued)

OTHER PUBLICATIONS

Office Action dated Apr. 1, 2019 in corresponding Swedish Patent Application No. 1851243-4.
(Continued)

*Primary Examiner* — Xiao En Mo
(74) *Attorney, Agent, or Firm* — Banner & Witcoff, Ltd.

(57) ABSTRACT

A pre-chamber arrangement (100) for a gas engine (1), including a pre-chamber body (20) accommodating a volume (30); and a supply device (50) for supplying a gaseous medium (52) into the pre-chamber volume (30); wherein the pre-chamber body (20) has a bottom portion (22) with channels (40) for allowing gas to flow between the pre-chamber volume (30) and a main combustion chamber (10) of the gas engine (1). Each channel (40) extends along a channel axis (C) from an inner opening (42) facing the pre-chamber volume (30) to an outer opening (44) configured to face the main combustion chamber (10). The bottom portion (22) has a curved outer surface (24). The channels (40) are obliquely arranged in relation to a radius (r) of the bottom portion (22). The bottom portion has flat surfaces (46) surrounding the outer openings of the channels.

20 Claims, 5 Drawing Sheets

(51) Int. Cl.
*F02B 19/10* (2006.01)
*F02B 43/00* (2006.01)

(56) References Cited

U.S. PATENT DOCUMENTS

| | | |
|---|---|---|
| 10,208,651 B2 * | 2/2019 | Tozzi .................... F02B 19/18 |
| 2003/0213461 A1 | 11/2003 | Regueiro |
| 2003/0213463 A1 | 11/2003 | Coleman et al. |
| 2011/0168801 A1 * | 7/2011 | Hubbard .................... F23R 3/14 |
| | | 239/11 |
| 2013/0055986 A1 * | 3/2013 | Tozzi .................... F02B 19/18 |
| | | 123/260 |
| 2014/0261298 A1 | 9/2014 | Sasidharan et al. |
| 2016/0245151 A1 * | 8/2016 | Yuuki .................... F02B 19/08 |

FOREIGN PATENT DOCUMENTS

| | | |
|---|---|---|
| EP | 3203050 A1 | 8/2017 |
| EP | 3366900 A1 | 8/2018 |
| FR | 2810692 A1 | 12/2001 |
| JP | 2007297942 A | 11/2007 |
| JP | 2012137083 A | 7/2012 |
| JP | 2014129788 A | 7/2014 |

OTHER PUBLICATIONS

Office Action dated Dec. 19, 2019 in corresponding Swedish Patent Application No. 1851243-4.
International Search Re~ort mailed Dec. 30, 2019 in corresponding PCT International Application No. PCT/S2019/050972.
Written Opinion dated Dec. 30, 2019 in corresponding PCT International Application No. PCT/SE2019/050972.

* cited by examiner

PRE-CHAMBER ARRANGEMENT FOR A GAS ENGINE AND A GAS ENGINE

CROSS-REFERENCE TO RELATED APPLICATIONS

This is a continuation patent application of U.S. patent application Ser. No. 17/282,010, filed Apr. 1, 2021, to be granted as U.S. Pat. No. 11,261,778 on Mar. 1, 2022, which is a 35 U.S.C. §§ 371 national phase conversion of PCT/SE2019/050972, filed Oct. 7, 2019, the contents of which are incorporated herein by reference, which claims priority of Swedish Patent Application No. 1851243-4 filed Oct. 11, 2018, the contents of which are incorporated by reference herein. The PCT International Application was published in the English language. All of the aforementioned patent applications are herein incorporated by reference in their entireties.

TECHNICAL FIELD

The present invention relates to a pre-chamber arrangement for a gas engine. The invention also relates to a method for combustion in a pre-chamber arrangement, a gas engine comprising such an arrangement and use of such a pre-chamber arrangement.

BACKGROUND

Combustion engines operating on gaseous fuels are spark ignited and are typically used for stationary applications. Such gas engines may be used for power generation and may, for example, operate on gas from digesters and sewage systems, natural gas or any other biogas. Heavy-duty gas engines are often lean-burn engines, which means burning of fuel with an excess of air. This results in a lower temperature in the combustion chamber and thereby lower NOx formation. However, lean burning requires higher ignition/activation energy and pre-chambers are therefore often used. Typically, a fully rich fuel gas is supplied into the pre-chamber during an intake stroke and this fuel gas is subsequently mixed with a lean gas mixture from the main combustion chamber of the cylinder. This way, a richer mixture of fuel gas and air is achieved in the pre-chamber and this gas mixture is ignited by a spark plug in the pre-chamber. The flaming gas and active components then spread into the main combustion chamber of the engine. By using a pre-chamber, less NOx is produced and the thermal efficiency is increased as higher compression ratios can be used.

However, using a pre-chamber is not uncomplicated. For example, due to time constraints, the mixing of the supplied fuel gas and the lean gas mixture from the main combustion chamber seldom or never becomes completely homogenous. To facilitate mixing between the supplied fuel gas and the lean gas mixture from the main combustion chamber different solutions relating to the openings/passages between the pre-chamber volume and the main combustion chamber. Document US 2003213461 A1, for example, discloses a pre-chamber structure having a plurality of transfer passages formed in a cup shaped tip portion. The passages are inclined in a tangential plane to achieve a swirling flow of gas entering the pre-chamber volume from the main combustion engine.

SUMMARY

Despite known solutions in the field, it would be desirable to develop a pre-chamber arrangement which overcomes or alleviates at least some of the drawbacks of the prior art.

An object of the present invention is thus to achieve an advantageous pre-chamber arrangement, which facilitates mixing between supplied gaseous medium and gas from the main combustion chamber. Another object of the present invention is to achieve a pre-chamber arrangement, which enables a more uniform flow into the pre-chamber volume.

The herein mentioned objects are achieved by a pre-chamber arrangement, a gas engine comprising such a pre-chamber arrangement, a method for combustion in a pre-chamber arrangement and use of such a pre-chamber arrangement disclosed herein.

Hence, according to an aspect of the present invention, a pre-chamber arrangement for a gas engine is provided. The arrangement comprises: a pre-chamber body accommodating a volume extending longitudinally along a centre axis (A); and a supply device for supplying a gaseous medium into the pre-chamber volume; wherein the pre-chamber body comprises a bottom portion with channels for allowing gas to flow between the pre-chamber volume and a main combustion chamber of the gas engine, wherein each channel extends along a channel axis from an inner opening facing the pre-chamber volume to an outer opening configured to face the main combustion chamber, and wherein the bottom portion comprises a curved outer surface. The channels are (obliquely) arranged such that the channel axis does not intersect the centre axis of the pre-chamber volume, and the bottom portion comprises flat surfaces surrounding the outer openings of the channels.

According to another aspect of the invention, a gas engine comprising such a pre-chamber arrangement is provided.

Pre-chambers for lean-burn gas engines are normally filled with a gaseous medium consisting of a rich fuel gas during an intake stroke in the cylinder associated with the pre-chamber. However, a rich fuel gas cannot be ignited and therefore has to be mixed to increase the amount of air in the gaseous medium. During a compression stroke, a lean gas mixture in the main combustion chamber is typically pressed into the pre-chamber volume and is mixed with the rich fuel gas in the pre-chamber volume. The gas mixture in the pre-chamber volume will thereby become leaner, but will still be richer than the gas mixture in the main combustion chamber. It is desired to ignite a gas mixture with an air-fuel ratio lower than a stoichiometric (stoich) mixture in the pre-chamber and it is desired to burn a gas mixture with a large amount of excessive air in the main combustion chamber. The gas mixture in the pre-chamber volume will then be ignited by means of a spark plug producing a small electric spark. The gas mixture of gaseous medium and lean gas mixture in the pre-chamber volume may also be referred to as fuel charge. In order to enable lean burning in the main combustion chamber, higher ignition energy is required. To achieve this, one may control where and how the fuel gas and the lean gas mixture from the main combustion chamber are mixed, and also how fast the gases are mixed. This may be complicated. By having channels that are obliquely arranged in relation to a radius of the bottom portion, the gas from the main combustion chamber will enter the pre-chamber volume swirling around the center axis of the pre-chamber volume. The swirling gas will facilitate mixing with the gaseous medium in the pre-chamber volume. However, since the channels are inclined and the bottom portion of the pre-chamber body has a curved outer surface, the outer openings will be inclined and thereby have an oval or elliptical shape. During compression, the gas in the main combustion chamber is flowing with high velocity towards the bottom portion of the pre-chamber body. An elliptical outer opening provides an uneven gas distribution/velocity inside the channel. The channels will thereby be used unevenly and the gas flow will not follow the direction of the channel axis. This gives poor flow direction stability into the pre-chamber volume and varies depending on gas velocity. With the pre-chamber arrangement according to the invention, the flat surfaces surrounding the outer openings will make the outer openings perpendicular to the channel axis even though the channel is inclined. The outer openings will thereby be circular. The flat surfaces will affect the flow direction of the gas. The gas from the main combustion chamber will thereby flow perpendicularly into the outer openings, the whole channels will be used evenly and the gas flow will follow the direction of the channel axis. This way, a more uniform flow of gas through the channels will be achieved independently of the gas flow velocity or pressure.

The control of gas entering the pre-chamber volume from the main combustion chamber may thereby be facilitated and more stable results are achieved.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various drawings, and in which.

DETAILED DESCRIPTION

Figure 1:
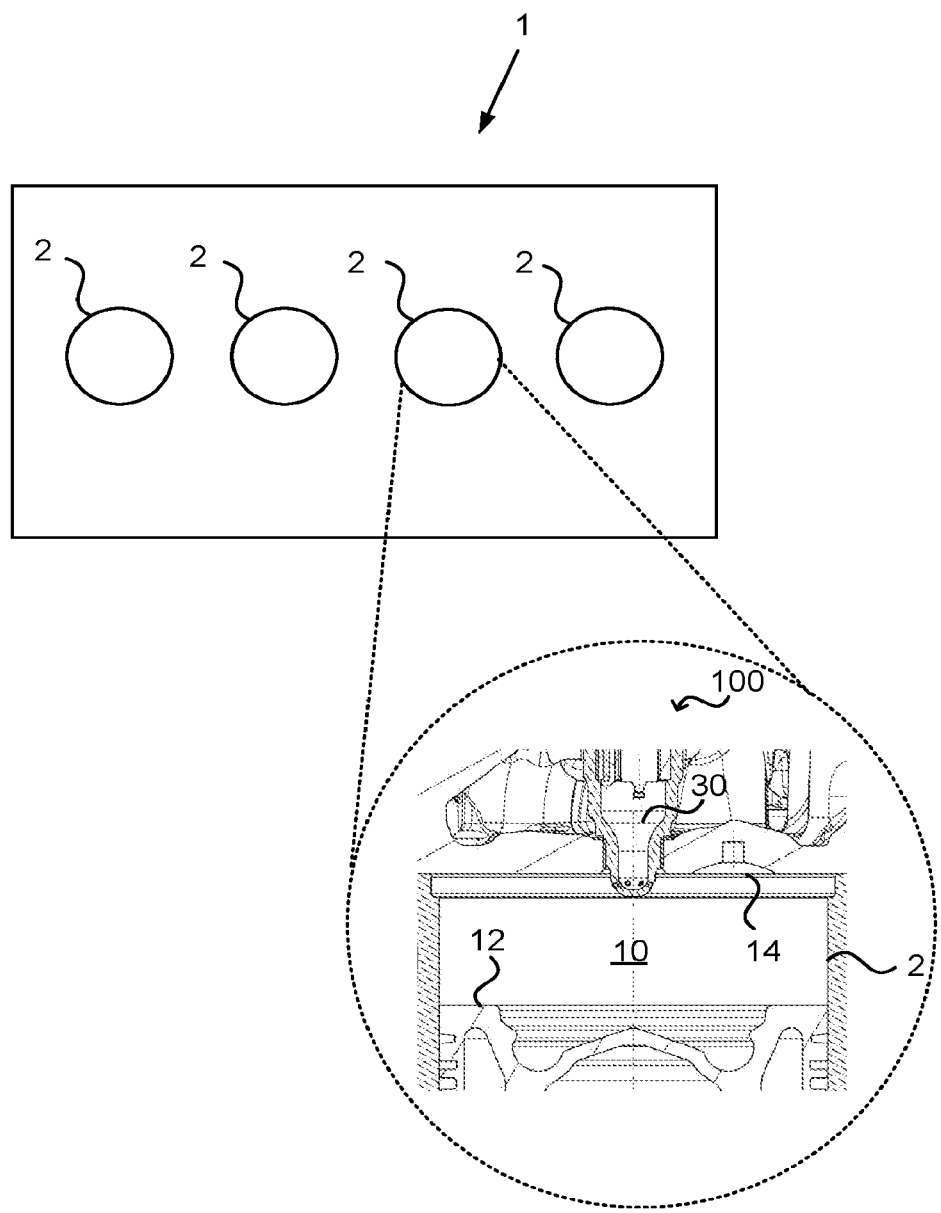
FIG. 1 schematically illustrates a gas engine according to an example.

To achieve a desired combustion in a lean-burn gas engine with a pre-chamber and to achieve as clean exhaust gas as possible, a desired gas mixture should be ignited in the pre-chamber volume. Achieving a desired gas mixture each time by mixing a supplied fuel gas with a lean gas mixture from the main combustion chamber, may be very difficult. To achieve a desired combustion in a cost efficient way and with an acceptable NOx emission level, a pre-chamber arrangement according to the disclosure has been developed. The present disclosure is applicable on all sorts of gas engines. The disclosure may relate to stationary gas engines, transport gas engines etc. Specifically, the present disclosure may relate to lean-burn gas engines for power generation.

Hence, according to an aspect of the present disclosure, a pre-chamber arrangement for a gas engine is provided. The arrangement comprises: a pre-chamber body accommodating a volume; and a supply device for supplying a gaseous medium into the pre-chamber volume; wherein the pre-chamber body comprises a bottom portion with channels for allowing gas to flow between the pre-chamber volume and a main combustion chamber of the gas engine, wherein each channel extends along a channel axis from an inner opening facing the pre-chamber volume to an outer opening configured to face the main combustion chamber and wherein the bottom portion comprises a curved outer surface. The channels are obliquely arranged in relation to a radius of the bottom portion, and the bottom portion comprises flat surfaces surrounding the outer openings of the channels. The radius referred to being a radius extending from where the channel axis intersects the outer opening of the channel to the centre point of the bottom portion.

The bottom portion of the pre-chamber body may have an essentially hemispherical shape. Alternatively, the bottom portion may have an essentially cylindrical shape. In both examples, the bottom portion has a curved outer surface through which the channels extend. The flat surfaces surrounding the outer openings may thus be formed in the curved outer surface. Without the flat surfaces surrounding the outer openings according to the present disclosure, the outer openings would be formed in a curved surface. Thus, without the flat surfaces surrounding the outer openings, the outer openings would be inclined and elliptical in shape. The curved outer surface may be referred to as convex, arched, curved or similar.

The flat surfaces may be configured, such that they extend perpendicularly to the channel axis of the corresponding channel. This way, the gas in the main combustion chamber will enter the channel perpendicularly. Since the bottom portion has a curved outer surface facing the main combustion chamber, the flat surfaces will be essentially circular in shape. Also, the flat surfaces will be eccentrically arranged in relation to the channels. Thus, the flat surfaces are not symmetrically arranged around the outer openings.

It is to be understood that the basic functions of a gas engine and a pre-chamber for spark plug ignition are considered to be known and will not be described in detail herein.

The gas from the main combustion chamber may be a lean gas mixture comprising a large amount of excess of air. The pre-chamber arrangement may thus be used for a lean-burn gas engine.

The pre-chamber volume may extend in a longitudinal direction between a top end and a bottom end, wherein the pre-chamber volume is configured to accommodate an end of a spark plug at the top end. The bottom end of the pre-chamber volume is associated with the bottom portion of the pre-chamber body. The pre-chamber volume extends longitudinally along a centre axis or centreline of the pre-chamber volume. The bottom portion comprises a centre point, from which the radius of the bottom portion extends. The centre axis of the pre-chamber volume extends through this centre point. The channels may thus be obliquely arranged in relation to the centre axis of the pre-chamber volume. In other words, the channels may be obliquely arranged in relation to a tangential plane of the curved outer surface. This means that the channels may be arranged, such that the channel axis of each channel does not intersect the centre point or the centre axis. The channels may be arranged with the channel axis extending at an angle in relation to the radius of the bottom portion, wherein the angle is larger than zero. The channels may be arranged with the channel axis extending at an angle in the range of 5-15 degrees in relation to the radius of the bottom portion. Thus, the channels may be arranged with the channel axis being offset in relation to the centre axis/centre point.

The channels in the bottom portion of the pre-chamber body may be referred to as nozzles. According to an example, the bottom portion of the pre-chamber body comprises at least six channels. It is, however, to be understood that the bottom portion may comprise any number of channels. The channels are suitably evenly distributed around the circumference of the bottom portion.

According to an example, the inner openings have an oval or elliptical shape. The inner surface of the bottom portion may be concave and since the channels are inclined, the inner openings will have an oval or elliptical shape.

The channels may comprise an inner portion, a main portion and an outer portion, where the inner portion comprises the inner opening and the outer portion comprises the outer opening. According to an example, the channels have a constant cross-sectional diameter. Thus, the inner portion, the main portion and the outer portion may have a similar cross-sectional diameter. Alternatively, the inner portion and/or the outer portion may have a cross-sectional diameter, which differs from the cross-sectional diameter of the main portion of the channel.

The inner portion and/or the outer portion may be funnel-shaped. According to an example, the outer openings comprises a rounding or a chamfer. The outer portion of the channels may thus comprise a rounding or a chamfer. The outer openings may thereby converge inwards in direction towards the inner opening. By having a rounding or chamfer, the flow coefficient through the channels may be improved.

The channels may extend obliquely downwards from the pre-chamber volume towards the main combustion chamber.

According to an example, the pre-chamber arrangement further comprises a valve device arranged upstream of the supply device, wherein the valve device is configured to open and close depending on the pressure inside the pre-chamber body. The valve device may thus be configured to control the supply of gaseous medium into the pre-chamber volume. The valve device may comprise a check valve. The valve device may thus be a passive valve. A passive valve does not need precise control and thereby facilitates the supply of gaseous medium. The feed pressure of the gaseous medium is the pressure, with which the gaseous medium is supplied into the pre-chamber volume. The feed pressure of the gaseous medium depends on the engine intake pressure and may be around 0.3 bar over the engine intake pressure. At maximum load on the engine, the feed pressure of the gaseous medium may be around 3 bar. During an intake stroke, the pressure in the main combustion chamber and the pre-chamber is lower than the feed pressure of the gaseous medium. The valve device will thereby open and gaseous medium will be supplied to the pre-chamber volume via the supply device. During a compression stroke, the cylinder piston moves upwards towards the pre-chamber volume and presses the lean gas mixture into the pre-chamber volume with a pressure typically in the range of 20-40 bar. The pressure in the pre-chamber volume will thereby become higher than the feed pressure of the gaseous medium and the valve device will close. The supply of gaseous medium is thereby terminated. The valve device may thus be configured, such that it is open when the pressure inside the pre-chamber volume is lower than the feed pressure of the gaseous medium, and closed when the pressure inside the pre-chamber volume is higher than the feed pressure of the gaseous medium.

The pre-chamber arrangement may further comprise a supply channel configured to be arranged in fluid communication with a gaseous medium source and the supply device. The supply channel may be arranged in fluid communication with the supply device, via the valve device.

The gaseous medium supplied directly into the pre-chamber volume by means of the supply device may be a pre-mixed fuel-air mixture. According to an example, the gaseous medium is a fuel-air mixture with an air-fuel ratio of 0.7. Alternatively, the gaseous medium supplied directly into the pre-chamber volume is a fully rich fuel gas, which is not ignitable.

According to an aspect of the present disclosure a gas engine is provided, the gas engine comprising at least one cylinder, wherein the gas engine further comprises a pre-chamber arrangement as disclosed herein. The gas engine may be of lean-burn type and the at least one cylinder may comprise an intake for a lean gas mixture. The gas engine may be configured for power generation. The gas engine may thus be configured to drive a generator, generating electrical power.

According to another aspect of the present disclosure, a method for combustion in a pre-chamber arrangement of a gas engine is provided. The pre-chamber arrangement comprises: a pre-chamber body accommodating a volume; and a supply device for supplying a gaseous medium into the pre-chamber volume; wherein the pre-chamber body comprises a bottom portion with channels for allowing gas to flow between the pre-chamber volume and a main combustion chamber of the gas engine, wherein each channel extends along a channel axis from an inner opening facing the pre-chamber volume to an outer opening configured to face the main combustion chamber, wherein the bottom portion comprises a curved outer surface, and wherein the channels are obliquely arranged in relation to a radius of the bottom portion, and the bottom portion comprises flat surfaces surrounding the outer openings of the channels. The method comprises: supplying gaseous medium into the pre-chamber volume by means of the supply device; ensuring that gas from the main combustion chamber enters the pre-chamber volume via the channels; and igniting a gaseous mixture in the pre-chamber volume. The gaseous mixture being ignited in the pre-chamber may be a mixture of the supplied gaseous medium and the gas from the main combustion chamber. Alternatively, the ignited gaseous mixture is the supplied gaseous medium being a pre-mixed fuel gas mixture.

Supplying gaseous medium inside the pre-chamber volume may be performed during an intake stroke. The gas from the main combustion chamber may be entering the pre-chamber volume during a compression stroke. Igniting the gaseous medium in the pre-chamber volume may be performed by means of the spark plug producing a small electric spark.

The present disclosure will now be further illustrated with reference to the appended figures.

FIG. 1 schematically shows a gas engine 1. Gas engine is considered to be a conventional term and thus means an engine operating on gaseous fuels. The gas engine 1 may be configured for power generation. The gas engine 1 may comprise at least one cylinder 2 and in this Figure shows an example with four cylinders 2. Each cylinder 2 comprises a main combustion chamber 10 and a piston 12 movably arranged in the main combustion chamber 10. The gas engine 1 may also comprise a pre-chamber arrangement 100 arranged in fluid communication with the main combustion chamber 10 of each cylinder 2. The pre-chamber arrangement 100 may be referred to as a pre-combustion arrangement. The pre-chamber arrangement 100 is arranged to ignite a gas mixture, whereby the flaming gas and active components are spread into the main combustion chamber 10 to help burning a lean gas mixture in the cylinder main combustion chamber 10. Each cylinder 2 comprises an intake 14 for a lean gas mixture. The pre-chamber arrangement 100 will be further described in FIGS. 2a-2c and FIG. 3.

Figure 2A:
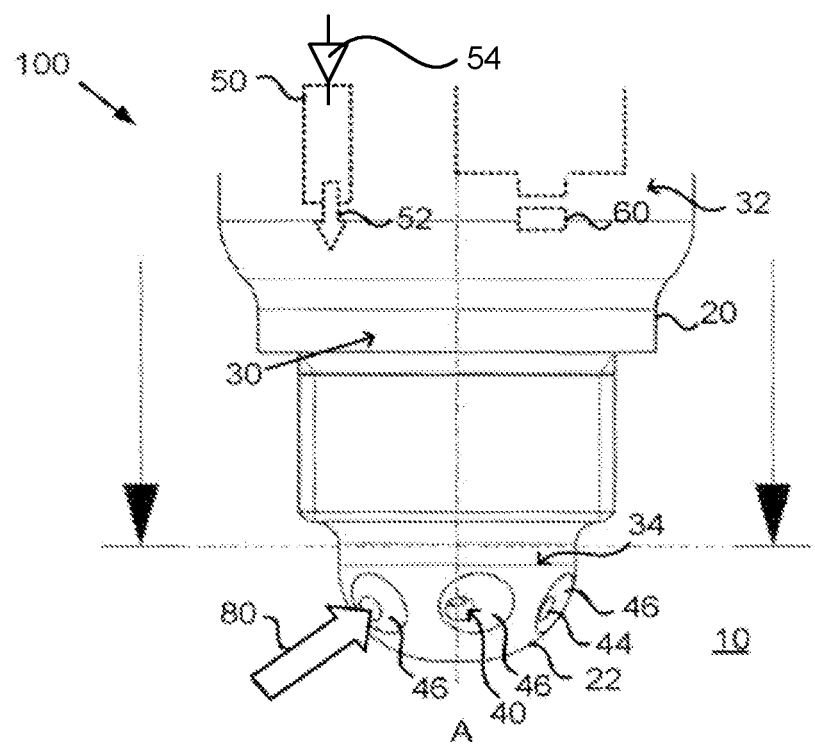
FIG. 2a-b schematically illustrates a pre-chamber arrangement according to an example.
Figure 2B:
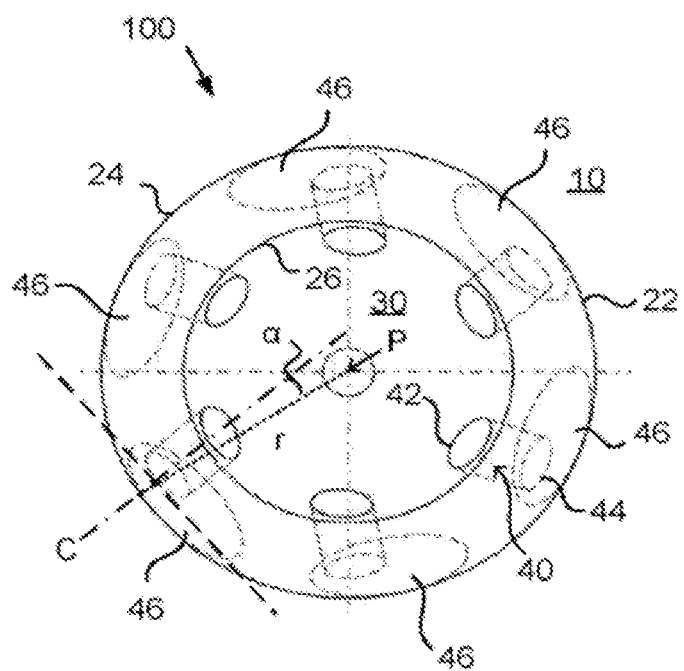

FIGS. 2a-2b schematically illustrates a pre-chamber arrangement 100 according to an example. The pre-chamber arrangement 100 is associated with a gas engine 1, and more specifically a gas engine cylinder 2, as disclosed in FIG. 1. FIG. 2a shows the configuration of the pre-chamber arrangement 100 and FIG. 2b show a cross-section view of the pre-chamber arrangement 100 as disclosed in FIG. 2a. For clarity, the references to features of the pre-chamber arrangement 100 as disclosed in FIG. 2a may not be shown in FIG. 2b. The pre-chamber arrangement 100 comprises: a pre-chamber body 20 accommodating a volume 30; and a supply device 50, for supplying a gaseous medium 52 into the volume 30 of the pre-chamber body 20. According to an example, the pre-chamber arrangement 100 further comprises a valve device 54 arranged upstream of the supply device 50, wherein the valve device 54 is configured to open and close depending on the pressure inside the pre-chamber body 20. The pre-chamber body 20 comprises a bottom portion 22 with channels 40 for allowing gas to flow between the pre-chamber volume 30 and the main combustion chamber 10 of the gas engine 1, wherein each channel 40 extends along a channel axis C from an inner opening 42 facing the pre-chamber volume 30, to an outer opening 44 configured to face the main combustion chamber 10. The bottom portion 22 further comprises flat surfaces 46 surrounding the outer openings 44 of the channels 40. The flat surfaces 46 may extend perpendicularly to the channel axis C of the respective channel 40.

The pre-chamber volume 30 may extend longitudinally along a centre axis A between a top end 32 and a bottom end 34. The pre-chamber volume 30 is typically configured to accommodate an end of a spark plug 60 at the top end 32. The bottom portion 22 comprises a curved outer surface 24, facing the main combustion chamber 10. In this example, the bottom portion 22 has an essentially hemispherical shape. The bottom portion 22 also comprises a concave inner surface 26 facing the pre-chamber volume 30. The inner openings 42 may have an oval or elliptical shape. The flat surfaces 46 may have an essentially circular or elliptical shape. The flat surfaces 46 may be eccentrically arranged in relation to the channels 40.

The channels 40 may be arranged, so as to provide a rotational movement of the gas 80 entering the pre-chamber volume 30 from the main combustion chamber 10. In FIG. 2b is illustrated that the channels 40 are obliquely arranged in relation to a radius r of the hemispherical bottom portion 22. This way, the gas 80 entering the pre-chamber volume 30 from the main combustion chamber 10 will have a rotational movement. The bottom portion 22 comprises a centre point P, from which the radius r of the hemispherical bottom portion extends. The centre axis A of the pre-chamber volume 30 extends through this centre point P. The channels 40 may thus be obliquely arranged in relation to the centre axis A of the pre-chamber volume 30. The channels 40 may be arranged with the channel axis extending at an angle α in the range of 5-15 degrees in relation to the radius r of the hemispherical bottom portion 22.

Figure 3A:
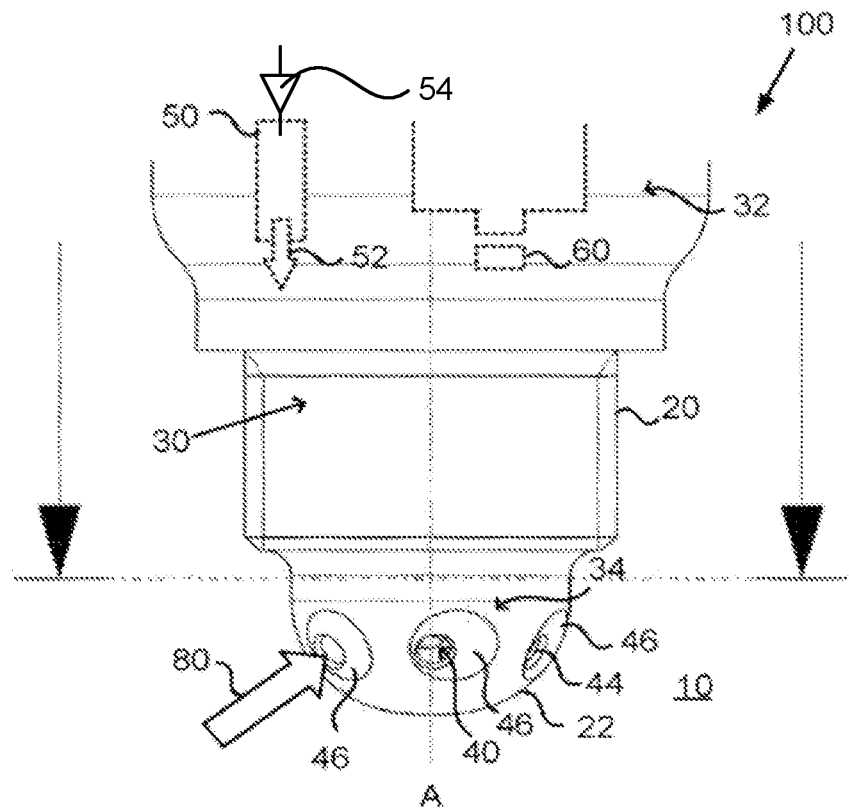
FIG. 3a-b schematically illustrates a pre-chamber arrangement according to an example.
Figure 3B:
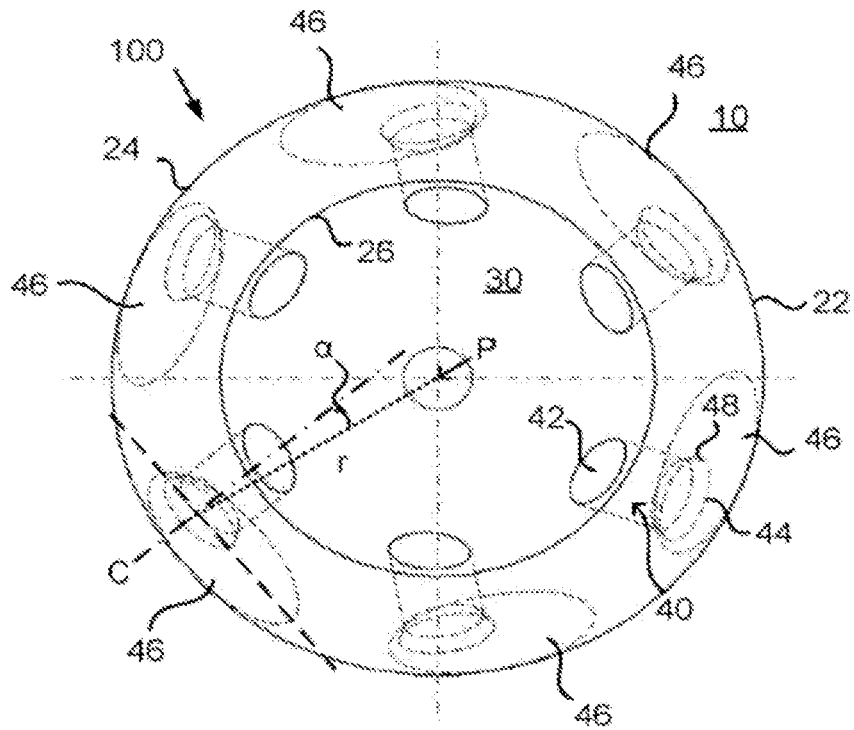

FIGS. 3a-3b schematically illustrate a pre-chamber arrangement 100 according to an example. The pre-chamber arrangement 100 is associated with a gas engine 1, and more specifically a gas engine cylinder 2, as disclosed in FIG. 1. The pre-chamber arrangement 100 may be configured as disclosed in FIGS. 2a-2b. In this example, the pre-chamber arrangement 100 the outer openings 44 comprises a rounding or a chamfer 48. Thus, in this example, the outer openings 44 converge inwards in direction towards the inner opening 42. The outer openings 44 will thus have a larger cross-sectional diameter than the inner openings 42.

Figure 4:
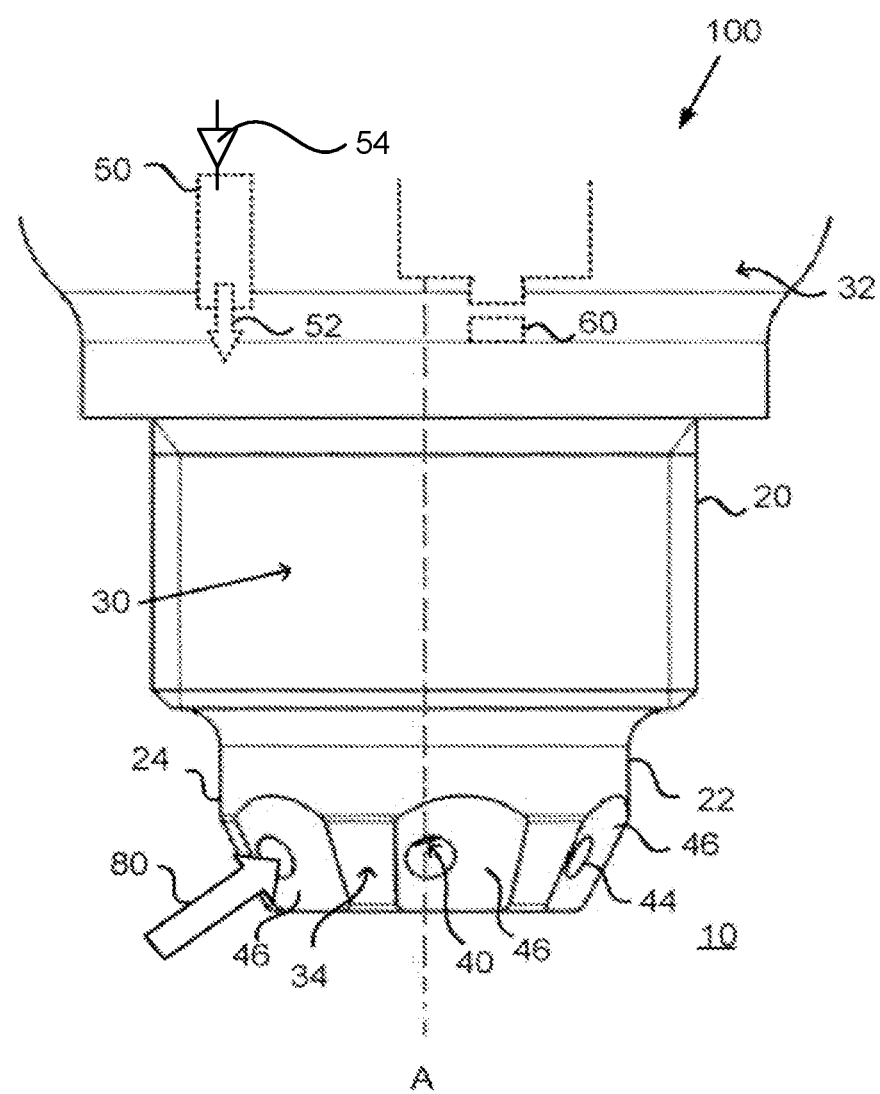
FIG. 4 schematically illustrates a pre-chamber arrangement according to an example.

FIG. 4 schematically illustrates a pre-chamber arrangement 100 according to an example. The pre-chamber arrangement 100 is associated with a gas engine 1, and more specifically a gas engine cylinder 2, as disclosed in FIG. 1. The pre-chamber arrangement 100 comprises: a pre-chamber body 20 accommodating a volume 30; and a supply device 50, for supplying a gaseous medium 52 into the volume 30 of the pre-chamber body 20. According to an example, the pre-chamber arrangement 100 further comprises a valve device 54 arranged upstream of the supply device 50, wherein the valve device 54 is configured to open and close depending on the pressure inside the pre-chamber body 20. The pre-chamber body 20 comprises a bottom portion 22 with channels 40 for allowing gas to flow between the pre-chamber volume 30 and the main combustion chamber 10 of the gas engine 1. Each channel 40 extends along a channel axis C from an inner opening 42 facing the pre-chamber volume 30, to an outer opening 44 configured to face the main combustion chamber 10, as illustrated in FIG. 2b and FIG. 3b. The bottom portion 22 further comprises flat surfaces 46 surrounding the outer openings 44 of the channels 40. The flat surfaces 46 may extend perpendicularly to the channel axis C of the respective channel 40.

The pre-chamber volume 30 may extend longitudinally along a centre axis A between a top end 32 and a bottom end 34. The pre-chamber volume 30 is typically configured to accommodate an end of a spark plug 60 at the top end 32. The bottom portion 22 comprises a curved outer surface 24, facing the main combustion chamber 10. In this example, the bottom portion 22 has an essentially cylindrical shape. The bottom portion 22 also comprises a concave inner surface 26 facing the pre-chamber volume 30 as illustrated in FIG. 2b and FIG. 3b. The inner openings 42 may have an oval or elliptical shape. The flat surfaces 46 may be eccentrically arranged in relation to the channels 40.

The channels 40 may be arranged, so as to provide a rotational movement of the gas 80 entering the pre-chamber volume 30 from the main combustion chamber 10. The channels 40 are obliquely arranged in relation to a radius r of the bottom portion 22. This way, the gas 80 entering the pre-chamber volume 30 from the main combustion chamber 10 will have a rotational movement. The bottom portion 22 comprises a centre point P, from which the radius r of the bottom portion extends. The centre axis A of the pre-chamber volume 30 extends through this centre point P. The channels 40 may thus be obliquely arranged in relation to the centre axis A of the pre-chamber volume 30. The channels 40 may be arranged with the channel axis extending at an angle α in the range of 5-15 degrees in relation to the radius r of the bottom portion 22.

Figure 5:
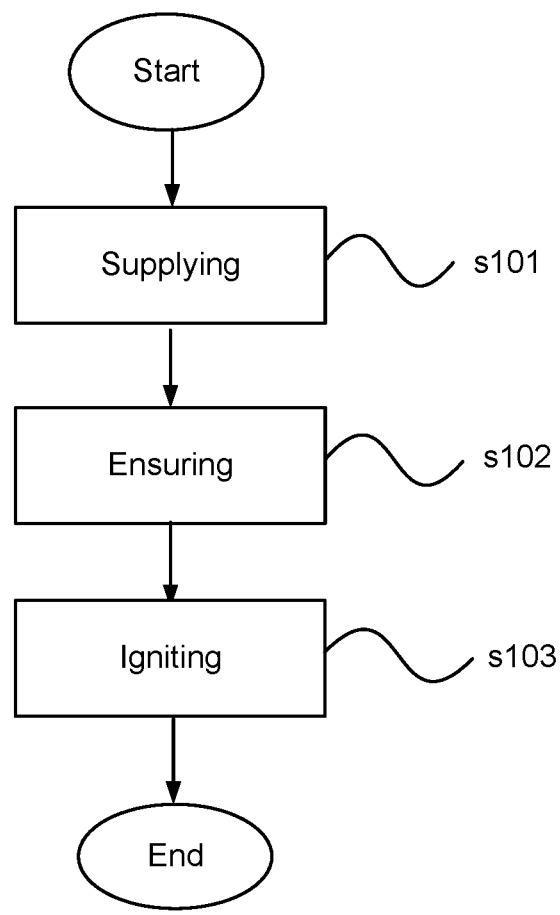
FIG. 5 illustrates a flow chart for a method according to an example.

FIG. 5 illustrates a flow chart for a method according to an example. The figure shows a flow chart for a method for combustion in a pre-chamber arrangement of a gas engine. The method thus relates to the gas engine 1 as disclosed in FIG. 1 and to the pre-chamber arrangement 100 as disclosed in FIG. 2a-2b, FIG. 3a-3b and FIG. 4. The method comprises: supplying s101 gaseous medium 52 inside the pre-chamber volume 30 by means of the supply device 50; ensuring s102 that gas 80 from the main combustion chamber 10 enters the pre-chamber volume 30 via the channels 40; and igniting s103 a gaseous mixture in the pre-chamber volume 30.

The step of supplying s101 gaseous medium 52 inside the pre-chamber volume 30 is performed during an intake stroke. The gas 80 from the main combustion chamber 10 is entering the pre-chamber volume 30 during compression. The step of igniting s103 the gaseous medium 52 in the pre-chamber volume 30 may be performed by means of the spark plug 60 producing a small electric spark.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

We claim:

1. A pre-chamber arrangement for a gas engine, the arrangement comprising:
   a pre-chamber body accommodating a pre-chamber volume extending longitudinally along a centre axis,
   the pre-chamber body comprises:
      a bottom portion comprising a curved outer surface that extends into a main combustion chamber, and
      channels in the bottom portion for allowing gas to flow between the pre-chamber volume and the main combustion chamber of the gas engine, each channel extends along a respective channel axis from an inner opening facing the pre-chamber volume to an outer opening of the channel configured to face the main combustion chamber,
   wherein the channels are arranged such that the respective channel axis of each channel does not intersect the centre axis of the pre-chamber volume, and in that the bottom portion comprises flat surfaces surrounding the outer openings of the channels.

2. The arrangement according to claim 1, wherein the bottom portion comprises at least six channels.

3. The arrangement according to claim 1, wherein the channels are arranged with the respective channel axis extending at an angle in a range of 5-15 degrees in relation to a radius of the bottom portion, the radius of the bottom portion extending from where the channel axis intersects the outer opening of the channel.

4. The arrangement according to claim 1, wherein the inner opening has an oval or elliptical shape.

5. The arrangement according to claim 1, wherein each channel has a constant cross-sectional diameter.

6. The arrangement according to claim 1, wherein the outer opening of each channel comprises a rounding or a chamfer.

7. The arrangement according to claim 1, wherein each channel extends obliquely downwards from the pre-chamber volume towards the main combustion chamber.

8. A gas engine, comprising at least one cylinder, wherein the gas engine further comprises a pre-chamber arrangement according to claim 1.

9. A pre-chamber arrangement for a gas engine, the arrangement comprising:
   a pre-chamber body accommodating a pre-chamber volume extending longitudinally along a centre axis;
   a supply device for supplying a gaseous medium into the pre-chamber volume; and
   a valve device arranged upstream of the supply device, wherein the valve device is configured to open and close depending on a pressure inside the pre-chamber body,
   wherein the pre-chamber body comprises:
      a bottom portion comprising a curved outer surface that extends into a main combustion chamber, and
      channels in the bottom portion for allowing gas to flow between the pre-chamber volume and the main combustion chamber of the gas engine, each channel extends along a respective channel axis from an inner opening facing the pre-chamber volume to an outer opening of the channel configured to face the main combustion chamber,
   wherein the channels are arranged such that the respective channel axis of each channel does not intersect the centre axis of the pre-chamber volume, and in that the bottom portion comprises flat surfaces surrounding the outer openings of the channels.

10. The arrangement according to claim 9, wherein the bottom portion comprises at least six channels.

11. The arrangement according to claim 9, wherein the channels are arranged with the respective channel axis extending at an angle in a range of 5-15 degrees in relation to a radius of the bottom portion, the radius of the bottom portion extending from where the channel axis intersects the outer opening of the channel.

12. The arrangement according to claim 9, wherein the inner opening has an oval or elliptical shape.

13. The arrangement according to claim 9, wherein each channel has a constant cross-sectional diameter.

14. The arrangement according to claim 9, wherein the outer opening of each channel comprises a rounding or a chamfer.

15. The arrangement according to claim 9, wherein each channel extends obliquely downwards from the pre-chamber volume towards the main combustion chamber.

16. A gas engine, comprising at least one cylinder, wherein the gas engine further comprises a pre-chamber arrangement according to claim 9.

17. A method for combustion in a pre-chamber arrangement of a gas engine according to claim 1 or 9, the method comprising:
   supplying gaseous medium into the pre-chamber volume by the supply device;
   ensuring the gas from the main combustion chamber enters the pre-chamber volume via the channels; and
   igniting a gaseous mixture of the supplied gaseous medium and the gas from the main combustion chamber.

18. The method according to claim 17, wherein the bottom portion comprises at least six channels.

19. The method according to claim 17, wherein the inner opening has an oval or elliptical shape.

20. The method according to claim 17, wherein each channel extends obliquely downwards from the pre-chamber volume towards the main combustion chamber.

* * * * *